United States Patent [19]

Ford

[11] Patent Number: 4,691,942

[45] Date of Patent: Sep. 8, 1987

[54] HOSE QUICK COUPLING APPARATUS

[76] Inventor: Michael B. Ford, General Delivery, Vernal, Utah 84078

[21] Appl. No.: 896,599

[22] Filed: Aug. 13, 1986

[51] Int. Cl.$^4$ ............................................. F16L 37/18
[52] U.S. Cl. ..................................... 285/84; 285/312
[58] Field of Search .................. 285/312, 320, 84, 85, 285/82

[56] References Cited

U.S. PATENT DOCUMENTS

| | | | |
|---|---|---|---|
| 322,286 | 7/1885 | Hemje | 285/85 |
| 521,122 | 6/1894 | Martin | 285/312 X |
| 815,627 | 3/1906 | Oldham | 285/84 |
| 2,277,399 | 3/1942 | Groff | 285/84 X |
| 2,309,279 | 1/1943 | Smythe | 16/179 |
| 2,478,586 | 8/1949 | Krapp | 285/173 |
| 3,124,374 | 3/1964 | Krapp | 285/85 |
| 3,268,249 | 8/1966 | Owens | 285/312 |
| 3,314,698 | 4/1967 | Owens | 285/312 |
| 3,343,852 | 9/1967 | Blight et al. | 285/82 |
| 3,385,613 | 5/1968 | McCall | 285/84 |
| 3,633,948 | 1/1972 | Dickey | 285/312 |
| 3,976,313 | 8/1976 | Lauffenburger et al. | 285/84 |
| 4,222,593 | 9/1980 | Lauffenburger | 285/85 |
| 4,295,670 | 10/1981 | Goodall et al. | 285/91 |
| 4,555,131 | 11/1985 | Weinhold | 285/91 |

FOREIGN PATENT DOCUMENTS

| | | | |
|---|---|---|---|
| 854250 | 4/1940 | France | 285/320 |
| 1562518 | 4/1969 | France | 285/320 |

*Primary Examiner*—Thomas F. Callaghan
*Attorney, Agent, or Firm*—Marcus L. Bates

[57] ABSTRACT

A quick disconnect cam locking fluid conveying coupling has a hollow male plug with there being an external circumferentially extending peripheral groove formed about the exterior thereof. The plug is received within a hollow socket and the socket has a pair of opposed windows aligned with the peripheral groove. Seal means interposed between the plug and the socket prevents fluid escaping from the coupling apparatus. A pair of cam members each have an operating lever and are positioned adjacent the socket with a cam portion passing through one of the windows and engaging the peripheral groove. A pair of ears is attached to the socket on opposed sides of the windows. A shaft extends through the ears and cam member so that each cam member is pivotally connected to the socket for outward movement of the levers away from the socket to disengage the cam for portions from the peripheral groove, thereby releasing the plug from the socket. Each shaft has a detent and each cam member is releasably locked in the detent by a spring loaded ball contained within the cam member. The ball is urged into and out of the detent by the spring, thereby retaining the lever in the locked position.

18 Claims, 8 Drawing Figures

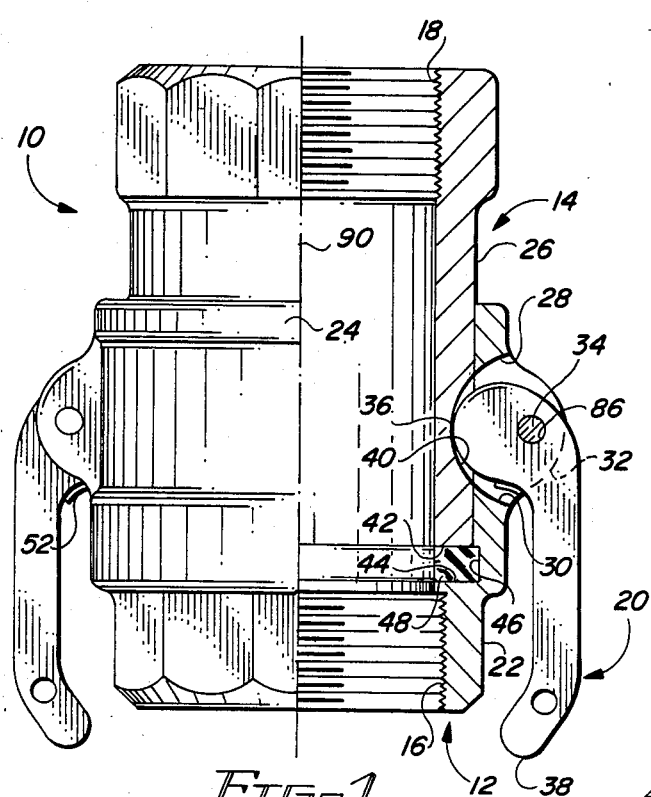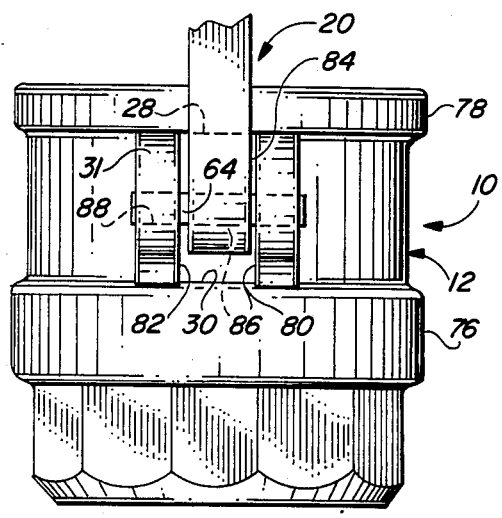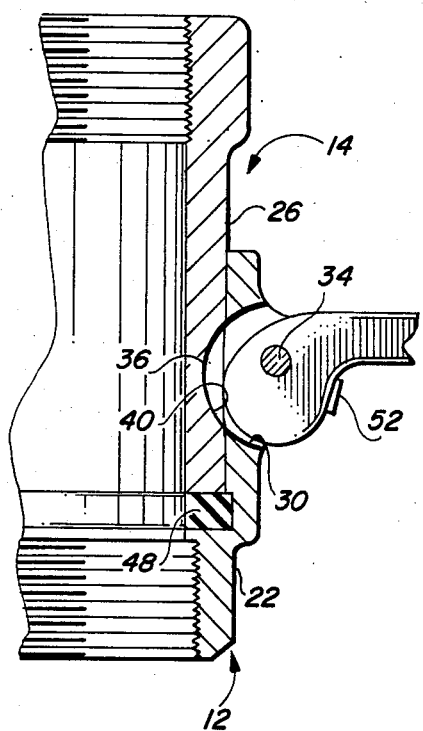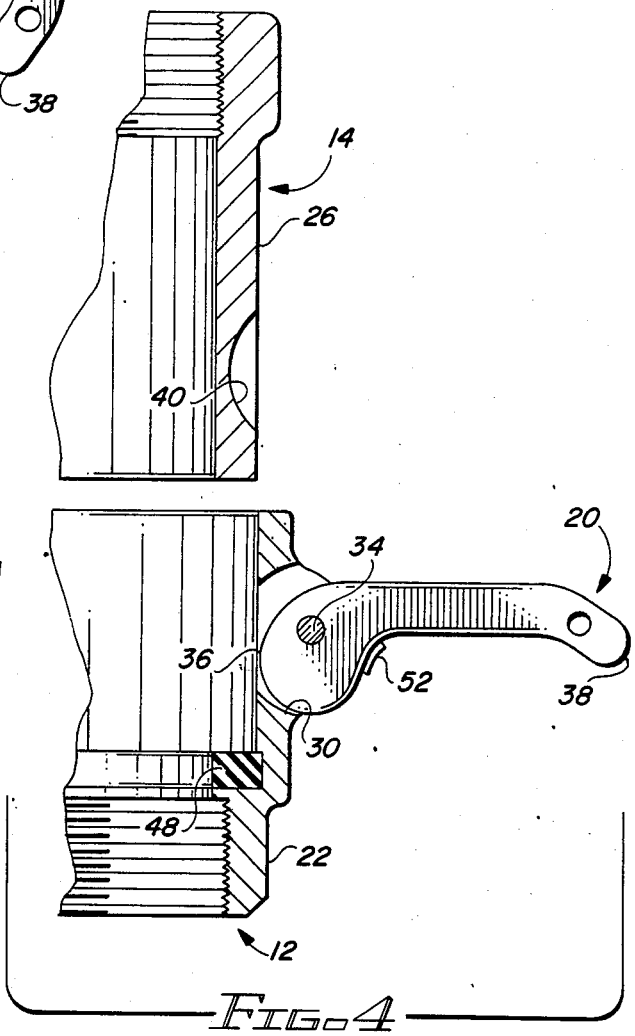
FIG.1
FIG.2
FIG.3
FIG.4

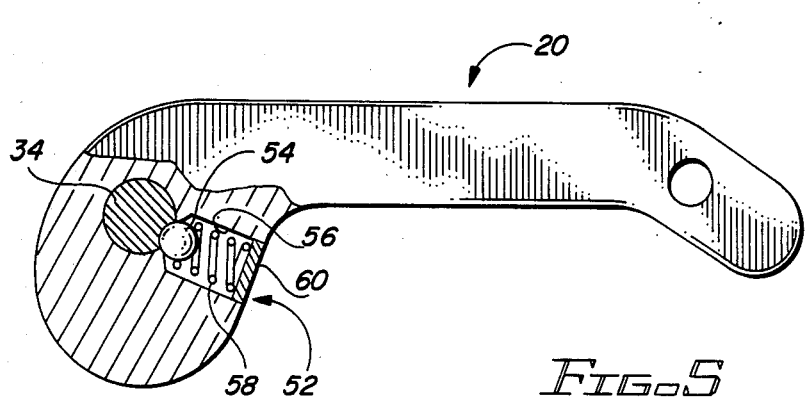
FIG. 5
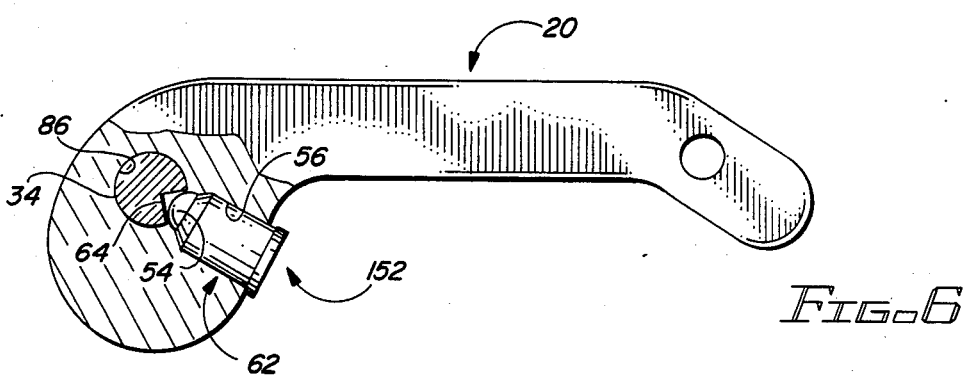
FIG. 6
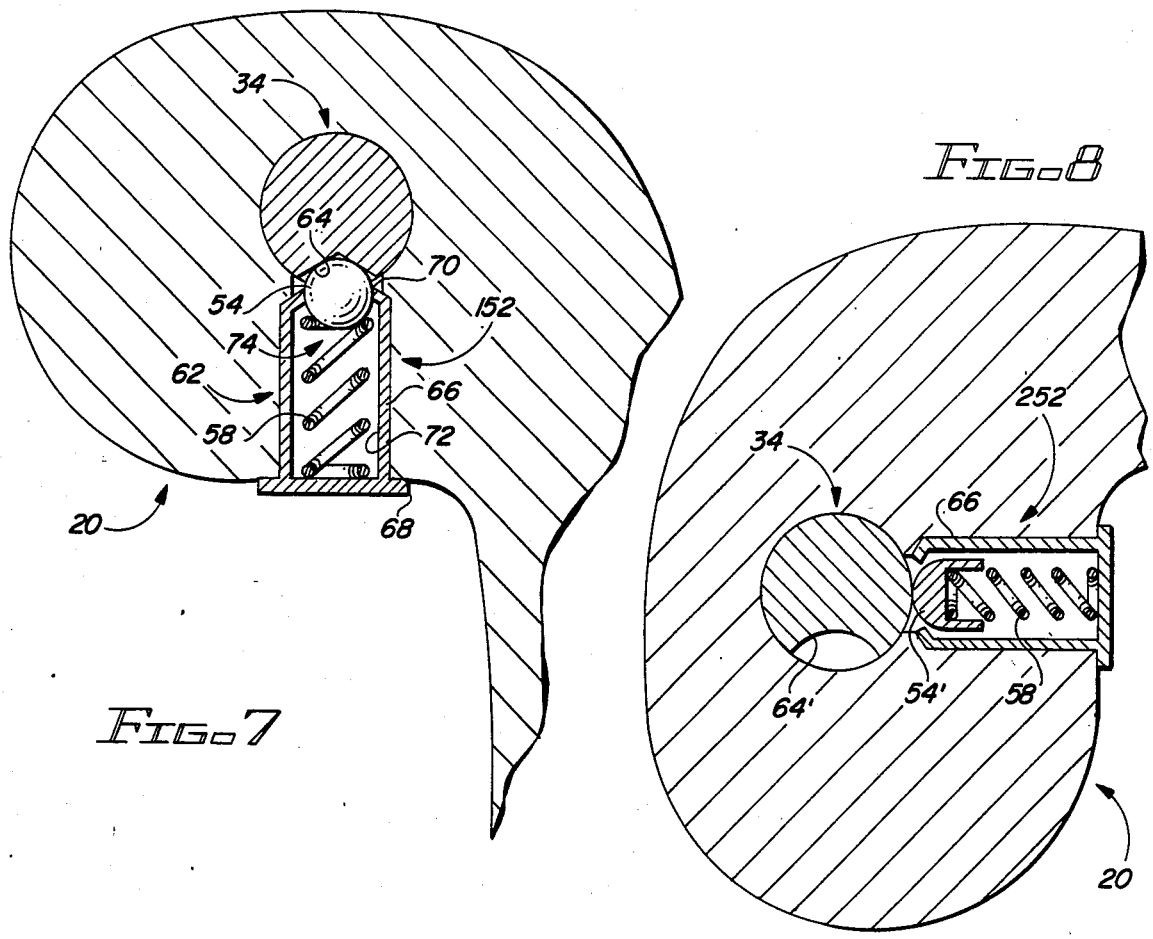
FIG. 7
FIG. 8

HOSE QUICK COUPLING APPARATUS

BACKGROUND OF THE INVENTION

Quick disconnect cam locking couplings enable a hose to be connected and disconnected from a tank in a minimum amount of time. The couplings include a plug received within a socket. In order to connect the hose ends, the socket is provided with a lever having a cam at the pivoted end thereof, so that the cam engages a peripheral groove in the plug, thereby locking the plug to the socket when the lever is in one position and releases the cam from the groove when the lever is rotated outwardly away from the socket.

Often the lever is inadvertently rotated from the locked to the unlocked position, thereby releasing the plug from the socket and freeing the hose ends and spraying the area with liquid. This is a catastrophe where toxic chemicals are involved, such as the use of insecticides and defoliants used in agriculture work, for example. Moreover, the chemicals are often very expensive and it is possible to lose hundreds of dollars of chemicals on the ground as well as contaminating the immediate area and worse yet, possibly enabling the toxic chemical to enter into the life chain of our planet.

It would therefore be desirable to have made available a foolproof means by which the levers that actuate the cam locking apparatus of a quick disconnect safety coupling can be releasably positioned in the locked position so that vibration and movement of the hose will not inadvertently unlock the cams and release the coupling members one from the other.

Moreover, when the levers are moved to the open position, it would be desirable to have the levers that actuate the cam to remain in the open position, thereby enabling the male plug member of the coupling to easily be received within the socket. Such an expedient facilitates connecting the plug to the socket, especially when the plug and socket are arranged along a vertical axis whereupon the levers tend to gravitate in a downward direction.

Apparatus which overcomes the above defects of the prior art and achieves the above stated desirable attributes is the subject of the present invention.

SUMMARY OF THE INVENTION

A quick disconnect cam locking safety coupling apparatus comprises a hollow male plug and a hollow socket. The male plug has a circumferentially extending external peripheral groove. The hollow socket receives said male plug therewithin in a sealed manner so that fluid is conducted therethrough. The socket includes a pair of side openings opposed to one another and aligned with respect to the peripheral groove of the plug.

A cam member having a lever extending therefrom is positioned within the side openings of the socket, with the cam portion thereof passing through the side openings and engaging said peripheral groove. The cam is pivotally connected to the socket so that outward movement of the lever away from the socket disengages the cam from the peripheral groove, and when rotated to the other position, the cam engages the peripheral groove and locks the plug within the socket.

Opposed pairs of spaced lugs extend from the socket on opposed sides of the side openings and receive a shaft in fixed relationship therebetween. The cam has a bore which pivotally receives the shaft therein. The shafts are arranged parallel to one another and peripendicular to the longitudinal axis of the socket. The cam members each pivot about the shaft in a plane which intersects the longitudinal axis of the socket.

The cam has a spring containing bore formed therein within which a ball-like piston and spring are captured. The spring bore is perpendicular to the shaft bore. A detent is formed longitudinally on the shaft while the piston is resiliently biased towards the detent by the spring biasing means located within the cam member.

The piston and detent are oriented respective to one another and the cam so that as the lever is pivoted against the socket, the piston enters the detent and releasably latches the same in the engaged position respective to the plug groove. Significant rotational force on the lever forces the piston out of the detent as the lever is moved towards the released position. The friction of the piston riding against the outer peripheral surface of the shaft causes the lever to remain wherever it may be positioned, thereby facilitating making up and breaking out the plug respective to the socket.

In a more specific form of the present invention, the piston and spring are mounted within a cartridge which is driven into the spring bore of the cam at a position which causes the piston to engage the detent of the shaft.

Accordingly, a primary object of the present invention is the provision of a quick disconnect cam locking coupling device having means by which the cam lever is releasably locked when positioned in the engaged configuration.

Another object of the present invention is the provision of a piston and detent located in the cam part of a quick disconnect cam locking coupling device which releasably holds the cam in the latched position.

A still further object of this invention is the provision of a quick disconnect coupling apparatus having a cam which engages a locking groove, and which further includes a ball and detent associated with the cam and a shaft therefor which releasably latches and holds the cam in the engaged position.

An additional object of the present invention is the provision of a resilient biasing means associated with the cam end of a lever of a quick disconnect coupling device which urges the lever to remain in the latched configuration.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a part cross-sectional, side elevational view of a quick disconnect safety coupling made in accordance with the present invention;

FIG. 2 is a broken, side elevational view taken 90° to the view of the FIG. 1;

FIG. 3 is a broken, part cross-sectional view of FIGS. 1 and 2, showing the apparatus in another operative configuration;

FIG. 4 is similar to FIG. 3 and shows the apparatus in another operative configuration;

FIG. 5 is an enlarged, broken, detailed, part cross-sectional view of part of the apparatus disclosed in the foregoing figures;

FIG. 6 is an enlarged, broken, part cross-sectional view of another embodiment of the present invention;

FIG. 7 is an enlarged, cross-sectional, detail of part of the apparatus disclosed in FIG. 6; and, FIG. 8 sets forth another modification of the present invention.

DETAILED DESCRIPTION OF THE PREFERRED EMBODIMENT

In the figures of the drawings, and in particular FIG. 1, there is disclosed a quick disconnect coupling apparatus 10 made in accordance with the present invention. The coupling 10 includes a main body female socket member 12 which receives a male plug member 14 therewithin in the illustrated manner of FIG. 1. The marginal internal end portion of the female socket member is threaded at 16 while the internal marginal end portion of the male or plug member 14 is threaded at 18.

A cam member 20 for locking the plug within the socket is positioned on opposed sides of the socket member 12. The exterior 22 of the socket 12 preferably is in the form of an annular member having an external surface in the form of an octagon so that a pipe wrench can be applied thereto. The interior 24 of the socket 12 is arranged in varying diameters with a marginal interior thereof slidably receiving the marginal end of the male pug as shown. Numerals 28 and 30 indicate the opposed sides of opposed side openings or windows for fromed through the socket in aligned relationship respective to one another.

As seen in FIG. 1, together with other figures of the drawings, numeral 32 indicates one of a pair of opposed ears for pivotally supporting cam member 20. Pivot shaft 34 is affixed to the illustrated bores formed through the spaced ears and the pivot shaft does not rotate respective to the ears but it can be forcibly driven from the ears.

The cam end 36 of the cam member 20 is received through the side openings. Numeral 38 indicates the lever end or free pivoted end of the cam member 20. A locking groove 40 circumferentially extends about the outer periphery of the male plug and is aligned with the cam end 36 of the cam member 20 and the side opening. A gasket groove is formed by annular wall surfaces 42, 44, 46 and receives a suitable gasket 48 therewithin. In FIG. 4, the cam member 20 is in the released position and the plug 14 has been removed from the socket 12.

As best seen in FIG. 5, together with other figures of the drawings, a releasable latch assembly 52 is comprised of a piston in the form of a ball 54 which is urged into the illustrated detent of shaft 34. A bore aligned perpendicular to the shaft 34 forms a spring chamber 56 which receives spring biasing means 58 therewithin, while closure member 60 is urged against the far end of the spring means and thereby urges the ball 54 towards the axial centerline of shaft 34.

FIGS. 6 and 7 set forth a modification 152 of the releasable latch assembly 52. The modified latch assembly 152 comprises the before mentioned shaft 34, which has the opposed marginal ends removably affixed in a non-rotatable manner respective to the bores formed through the ears 31 and 32, thereby providing a pivot for the cam member or locking lever. The modified releasable latch assembly 152 of FIGS. 6 and 7 includes a cartridge 62 which is received in close tolerance relationship within bore 56 formed into the cam end of cam member 20. As seen in FIG. 6, the bore 56 lies perpendicular to the shaft 34 and the bore 56 is pivoted within a plane that is intersected by the longitudinal axial centerline of the socket 12.

As particularly seen illustrated in FIG. 7, the modified releasable latch assembly 152 includes the before mentioned cartridge 62 which is placed perpendicular respective to the groove 64 formed in the pivot pin or shaft 34. Numeral 66 broadly indicates a housing which forms the cartridge exterior. The cartridge has a rim 68 which can be deformed against the outer peripheral surface of the cam end of locking lever 20. The opposed end of the cartridge is inwardly turned at 70, thereby capturing the ball-like piston 54 in the illustrated manner of FIGS. 6 and 7.

The inner wall surface 72 of the housing 66 forms a spring chamber 74 within which the before mentioned spring 58 is captured, with the opposed ends of the spring bearing against the rim 68 and ball 54.

Looking again now to FIG. 2, in conjunction with other figures of the drawings, wherein the socket 12 of the coupling 10 is seen to include spaced circular enlargements 76, 78 against which a pipe wrench or the like can be placed for making up the socket with respect to the hose end (not shown). The before mentioned side opening includes opposed sides 80 and 82. The shaft 34 and cam end of the locking lever 20 are received within the window with there being a small space at 84 left between the confronting sidewalls of the locking lever 20 and ear 32, for example. Numeral 86 indicates a bore formed through the cam end of locking lever 20, while numeral 88 indicates a bore that extends through the pair of ears 31, 32.

The ears 31, 32 preferably extend into fixed relationship respective to the enlargement 76, 78 thereby greatly reinforcing and increasing the structural strength of the socket member.

In FIG. 8, cartridge 252 includes the before mentioned sidewalls 66 and springs biasing means 58. A bullet shaped piston member 54' has been substituted for the round ball 54 previously illustrated in FIGS. 6 and 7. The bullet shaped member 54' is received within an arcuate detent 64' rather than a V-shaped groove or detent as seen at 64 in FIGS. 6 and 7.

The releasable latch assembly 52, 152, and 252 therefore comprises a resilient member 58 housed within a locking lever 20 and preferably within the cam end of the locking lever 20, with there being means 54 which is resiliently urged towards the axial centerline of a shaft 34. A detent 64, which can take on a number of different forms, releasably receives the biasing member 54 therewithin and thereby releasably latches the cam member 20 in the closed or latched position seen illustrated in FIGS. 1, 5, 6, and 7.

The locking lever 20 can be pivoted against the force of the spring 58, ball 54, and detent 64 into any of an infinite number of different positions, as for example, seen in FIG. 4. The friction between the piston 54 and the outer peripheral surface of the shaft 34 will maintain the locking lever 20 in whatever position it is placed. A very small force is required to move the locking lever from an intermediate position, as seen in FIG. 4, into a releasable locked or latched position as seen illustrated in FIGS. 5-7. As the piston 54 enters the groove 64, the force of the spring causes the lever to seek the latched position within a small angle of movement of the lever 20. A much larger force is required to move the locking lever 20 from the position of FIGS. 1 and 5-7 into the position of FIG. 4, for example.

The apparatus is assembled by first fabricating the releasable latch assembly 52 and assembling the parts with the shaft 34, lever 20, and bore 86 being properly oriented so that as the ball 54 is received within the detent 64, the locking lever 20 is in the latched position as seen illustrated in FIGS. 1 and 5.

In the embodiment of FIGS. 6-8, the cartridge 62 is fabricated with the spring 58 and piston member 54 being included therewithin. The cartridge barrel is driven into the bore 56 and into the illustrated position seen in FIGS. 6 and 7. At this time, shaft 34 must be received within bore 88 of ears 31, 32 such that the locking lever 20 is urged into the position of FIG. 1 when the handle is rotated against the socket so that the ball 54 falls within the detent 64.

I claim:

1. A quick-disconnect cam locking safety coupling having a hollow male plug with an external peripheral groove, a hollow socket receiving said male plug and forming said coupling, said socket having a pair of opposed side openings aligned with said peripheral groove; mounting ears on opposed sides of the opening; means, including a gasket, for sealing between the male plug and the socket; a pair of cam members each having a lever extending therefrom and lying adjacent the socket with there being a cam portion passing through one of said side openings and engaging said peripheral groove; a shaft supported by said ears by which each of said cam members are pivotally connected to the socket for outward movement of the levers away from the socket to disengage the cam portions from the said peripheral groove; the improvement comprising:

a bore formed through said cam member, said bore communicates with said shaft and is perpendicular thereto; a detent formed in said shaft adjacent said bore, a piston reciprocatingly received within said bore, biasing means urging said piston towards the detent;

said shaft is non-rotatably supported by said ears, said cam member pivots about the fixed shaft;

said bore and detent are oriented respective to said socket whereby said cam member is releasably locked when the lever is moved against the socket.

2. The improvement of claim 1 wherein said piston and biasing means is enclosed within a cylindrical housing and said housing is received within said bore; said cylindrical housing outwardly opens towards said shaft so that said piston is aligned with said detent when the lever is moved against the socket.

3. The coupling of claim 2 wherein said detent is concave and said piston is a ball.

4. The coupling of claim 2 wherein said detent is a V-shaped groove.

5. The coupling of claim 2 wherein said piston is a cylinder having a rounded forward end.

6. The coupling of claim 1 wherein said cam member pivots about the fixed shaft, said piston and biasing means is enclosed within a cylindrical housing and said housing is received within said bore;
   wherein said detent is a V-shaped groove;
   wherein said piston is a cylinder having a rounded forward end.

7. The couling of claim 1 wherein said detent is concave and said piston is a ball.

8. A quick-disconnect cam locking safety coupling comprising:

a hollow male plug having an external peripheral groove; a hollow socket receiving said male plug and having a pair of opposed side openings opposite said peripheral groove; mounting ears attached to the socket and positioned on each side of the side opening; a gasket for sealing between the male plug and the socket;

a pair of cam members each having a lever lying adjacent the socket and a cam portion passing through one of said side openings and engaging said peripheral groove to thereby attach the plug within the socket; shaft means pivotally connecting said cam members to said ears of the socket for outward movement of the levers away from the socket to disengage the cam portions from the said peripheral groove and thereby release the plug from the socket;

means forming a latch receiving bore within said cam member, the bore communicates with said shaft; a detent formed in said shaft in aligned relationship respective to the bore when said levers are pivoted towards the socket to engage the cam portions with the peripheral groove;

said shaft is non-rotatably supported by said ears, said cam member pivots about the fixed shaft;

a piston reciprocatingly received within the bore, means biasing said piston towards the shaft axis so that part of the piston releasably engages the detent when the lever is pivoted towards the socket.

9. The coupling of claim 8 wherein said piston and biasing means is enclosed within a cylindrical housing and said housing is received within said bore; said housing has an opening adjacent said shaft through which said piston extends into abutting engagement with the shaft.

10. The coupling of claim 9 wherein said detent is concave and said piston is a ball.

11. The coupling of claim 9 wherein said detent is a V-shaped groove.

12. The coupling of claim 9 wherein said piston is a cylinder having a rounded forward end.

13. The coupling of claim 8 wherein said piston and biasing means is enclosed within a cylindrical housing and said housing is received within said bore;
   wherein said detent is a V-shaped groove;
   wherein said piston is a cylinder having a rounded forward end which extends into engagement with said shaft.

14. The coupling of claim 8 wherein said detent is concave and said piston is a ball.

15. In a quick-disconnect cam locking safety coupling of the type that includes a hollow male plug having an external peripheral groove; a socket receiving said male plug and having a pair of opposed side openings positioned opposite said peripheral groove; a gasket means for sealing between the male plug and the socket; mounting ears extending from said socket on opposed sides of said side opening; a pair of cam members each having a lever, and a cam portion passing through one of said side openings and engaging said peripheral groove, and each including a nonrotable fixed shaft means supported from the mounting ears of said socket by which each said cam member is pivotally connected to the socket for outward movement of the levers away from the socket to disengage the cam portions from said peripheral groove; the improvement comprising:

latching means for releasably locking each cam member in the groove engaging position, including a detent formed in a medial part of the shaft, a bore formed in the cam member and having an opening aligned with the detent when the lever is positioned against the socket;

a piston reciprocatingly received within the bore, means biasing said piston into the detent, whereby;

movement of the lever away from the socket forces the piston from the detent, while movement of the lever towards the socket positions the piston within the detent and releasably latches the cam member in the made-up configuration.

16. The improvement of claim 15 wherein said shaft is non-rotatably supported by said ears, said cam member pivots about the fixed shaft, said piston and biasing means is enclosed within a cylindrical housing and said housing is received within said bore.

17. The improvement of claim 16 wherein said detent is concave and said piston is a ball.

18. The improvement of claim 16
wherein said detent is a V-shaped groove;
wherein said piston is a cylinder having a rounded forward end.

* * * * *

UNITED STATES PATENT AND TRADEMARK OFFICE
CERTIFICATE OF CORRECTION

PATENT NO. : 4,691,942

DATED : September 8, 1987

INVENTOR(S) : MICHAEL B. FORD

It is certified that error appears in the above-identified patent and that said Letters Patent is hereby corrected as shown below:

Under Abstract, line 17, substitute --portion-- for "for portions";

Column 3, line 30, substitute --plug-- for "pug";
          Line 31, delete "for";
          Line 32, delete "fromed" and insert --formed--;

Column 7, line 2, substitute --into-- for "in".

Signed and Sealed this

First Day of March, 1988

*Attest:*

DONALD J. QUIGG

*Attesting Officer*      *Commissioner of Patents and Trademarks*